United States Patent [19]
Hwang

[11] Patent Number: 5,155,790
[45] Date of Patent: * Oct. 13, 1992

[54] ELECTRONIC SCANNER OR PRINTER WITH ORDERED FIBER OPTIC ARRAY

[75] Inventor: Cherng-Jia Hwang, Watchung, N.J.

[73] Assignee: Photon Imaging Corp., So. Plainfield, N.J.

[*] Notice: The portion of the term of this patent subsequent to May 14, 2008 has been disclaimed.

[21] Appl. No.: 532,932

[22] Filed: Jun. 4, 1990

[51] Int. Cl.$^5$ .............................. G02B 6/06
[52] U.S. Cl. .................. 385/121; 385/116; 355/1
[58] Field of Search .......... 350/96.1, 96.15, 96.25, 350/96.28, 96.24; 385/121, 133, 116, 47, 115; 355/1

[56] References Cited

U.S. PATENT DOCUMENTS

4,564,866 1/1986 Comberg ............. 350/96.25 X
4,807,963 2/1989 Iwasaki ............. 350/96.25 X
4,812,012 3/1989 Terada et al. ............. 350/96.25 X Primary Examiner—John D. Lee
Assistant Examiner—Stephen W. Barns
Attorney, Agent, or Firm—Herbert M. Shapiro

[57] ABSTRACT

An electronic scanner or printer using a fiber optic bundle and employing an initialization procedure is rendered more reliable, less expensive and provides a relatively easy path to gray scale and high resolution performance by using a unique fiber optic bundle. The bundle comprises ribbons of square fibers where the ribbons are set side by side at one end of the bundle and stacked at the other. Each square fiber of each ribbon comprises multiple rows and columns of (core) fibers each with a cladding to ensure total internal reflection of light. Gray scale is achieved by varying the exposure time and consequently the energy per pixel on a treated media or by statistically changing the amount of toner on an OPC drum creating limited apparent shades of black spots on a developed page.

19 Claims, 6 Drawing Sheets

ELECTRONIC SCANNER OR PRINTER WITH ORDERED FIBER OPTIC ARRAY

FIELD OF THE INVENTION

This invention relates to an electronic scanner or printer which employs a plurality of light conduits and more particularly to such a scanner or printer which employs a fiber optic bundle.

BACKGROUND OF THE INVENTION

U.S. Pat. No. 4,760,421 issued Nov. 15, 1989 to George D. Margolin discloses electronic scanners and printers which employ fiber optic bundles. The bundles are non coherent in the sense that there is no predetermined relationship between the ends of the fibers in first face of the bundle and the opposite ends of the fibers in a second face.

The fiber bundle in each instance is organized so that the first face has a linear geometry and the second face has an area geometry. For a printer, an organic or selenium photoconductor such as a photosensitive medium or an electrostatic drum is optically coupled to the linear face and a light beam from a source, such as a cathode ray tube (CRT), is directed into the second face. The beam positions in the second face at which light is introduced are determined during an initialization procedure which identifies those positions to correspond with the pixel positions in the linear face to ensure the faithful reproduction of a stored image at the linear face.

The operation as a scanner is somewhat different but uses the same fiber optic bundle configuration and a similar initialization procedure. The scanner is operative to scan a document which is juxtaposed with the linear face of the bundle. Instead of a photosensitive medium at the linear face, a platen is positioned there or a set of rollers for moving a document. A sensor is positioned to detect light transmitted through or reflected from the document. Such a scanner is disclosed in U.S. Pat. No. 4,918,304 of Eugene I. Gordon issued Apr. 17, 1989.

Both printers and scanners are marketed by many companies and the market place is hotly contested as is well known. Therefore, any reduction in complexity or improvement in performance is desirable. In accordance with the principles of the present invention, both benefits are achieved, along with a relatively small configuration and higher reliability.

BRIEF DESCRIPTION OF THE PRESENT INVENTION

The present invention is directed at the use of unique optical fibers for the optical subassembly of an electronic scanner or printer of the type described above. The fibers are available commercially. Bundles now made with such fibers are in coherent form where the geometries of the bundle at the entrance and the exit fields are identical and are used presently for optical transmission for remote, direct viewing of an image or for light illumination. It is believed that the recognition that such fibers are 1) useful in the scanner or printer organization in a bundle which is not necessarily coherent and has one linear face and one area face as described above and
2) that the bundle can be subjected to an initialization procedure to permit such use along with
3) the adaptation of that organization to capitalize on the unique opportunities offered by such a bundle constitute significant and surprising departures from prior art thinking.

The bundle comprises a plurality of multi-core fiber ribbons which are organized in parallel and in fixed positions. The fibers illustratively are square in cross section and each fiber includes within it illustratively eight rows of eight glass fiber cores, in a coherent matrix, each with its own cladding to ensure total internal reflection of transmitted light, thereby eliminating cross-talk.

A single line of square fibers are joined into ribbons nominally, one hundred fibers wide and the ribbons are joined side by side to form the linear first face of the bundle. Nominally, fifty one ribbons of one hundred square fibers (total-5100 fibers) are required for an eight and one half inch document. The opposite ends of the (fifty one) ribbons are stacked on top of one another to form the second (area) face of the bundle. Thus, a bundle useful in accordance with the principles of this invention comprises multi-fiber ribbons arranged linearly at one end and stacked at the other end to form an area face where each fiber in each ribbon contains a coherent set of fibers organized in rows and columns. Such fiber ribbon are commercially available; but when used in conjunction with a light source for generating light at a succession of positions, or for generating light, simultaneously, in a set of positions in the area face determined by an initialization procedure and coupled to a photosensitive medium or, alternatively to a paper mover and sensor arrangement, provide a means for providing a physically strong bundle, realizing a highly effective device and for achieving gray scale in a particularly simple manner.

DETAILED DESCRIPTION OF ILLUSTRATIVE EMBODIMENTS OF THIS INVENTION

Figure 1:
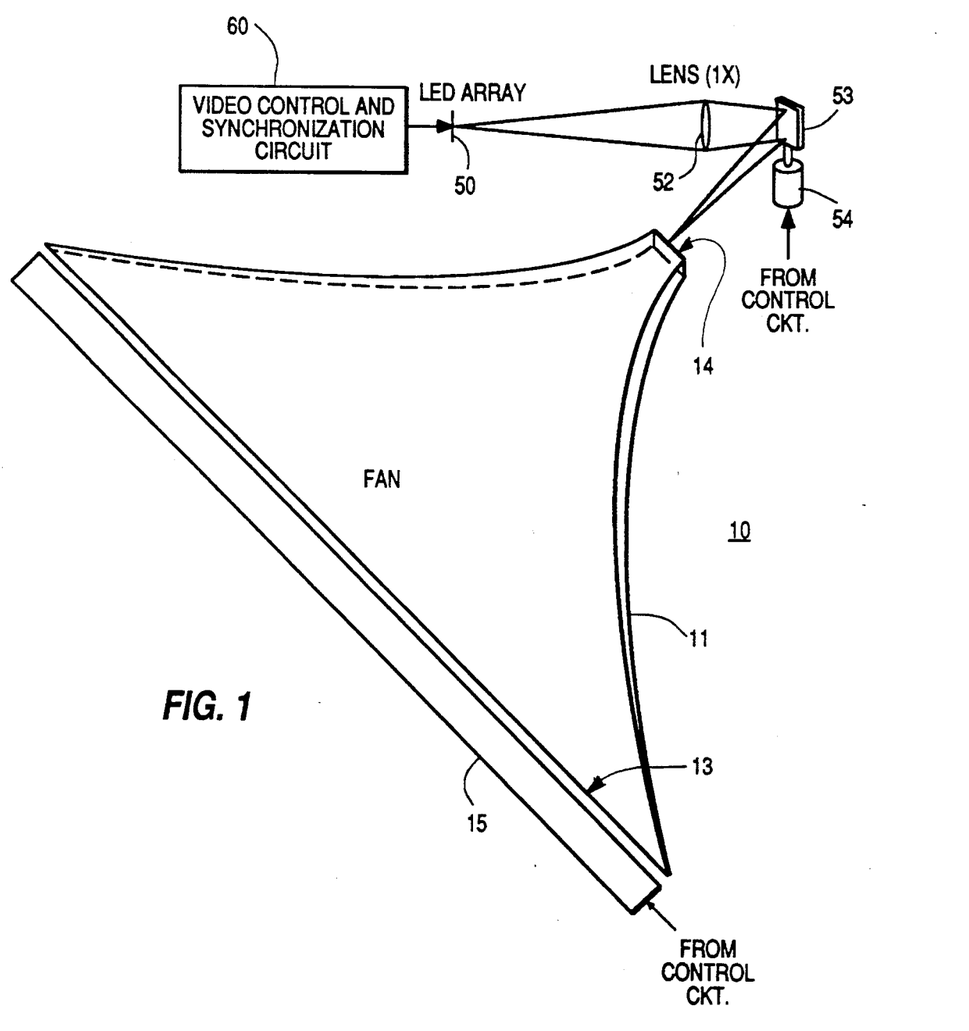
FIG. 1 is a schematic diagram of an optic subassembly useful for a printer in accordance with the principles of this invention.

FIG. 1 is a schematic illustration of a printer 10 employing conduits or waveguides for transmitting optical energy. The conduits comprise a bundle 11 of optical fibers arranged in a fan geometry which is linear at a first face 13 and which has an area second face 14. In the illustrative embodiment, the printer, is adapted to print across an eight and one half inch document. Thus, face 13 is eight and one half inches long.

The linear first face 13 is juxtaposed to a photosensitive medium which conveniently comprises an organic photoconductive (OPC) drum operative to form a latent image. OPC drums are available commercially and are supplied as a unit along with toner, transfer and fixer stations operative to transfer an image from the drum to plain paper. Such available apparatus is represented by rectangle 15 in the figure.

Fiber optic bundle 11 is operative to transmit pixels, representative of an image introduced at face 14, to linear face 13 for recreating that image faithfully on a linear segment of the electrostatic drum. Successive lines of a stored image are created on consecutive linear segments of the drum to generate an image of an entire page for later transfer to plain paper.

We will now discuss the structure of the fiber optic bundle and, thereafter, the manner of generating a representation of the stored image to be transmitted through the bundle.

Figure 2:
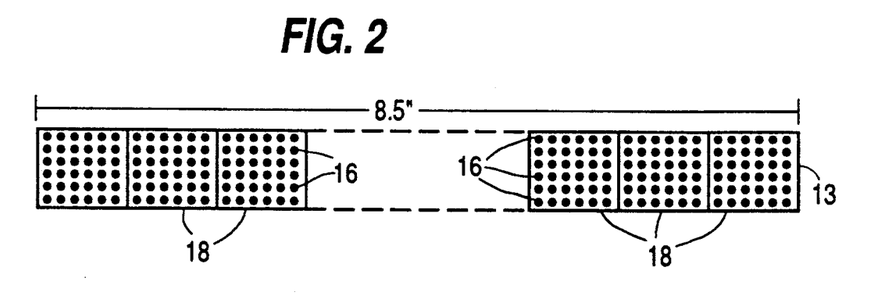
FIGS. 2 and 3 are schematic illustrations of the linear and area faces of an illustrative bundle of square fibers useful for the scanner or printer of FIG. 1.

FIG. 2 shows a schematic representation of the linear first face 13 of bundle 11. The face comprises a plurality of square "compound" fibers 18 (viz: nxn matrix) typically of glass. Each fiber 18 is called a compound or "multicore" fiber because it comprises a plurality of optical fibers, designated fiber cores. The fiber cores are represented as dots numbered 16 in the figure. For an eight and one half inch document, face 13 comprises, nominally 5100 square fibers, although that number can be increased or reduced while maintaining the resolution constant as will become clear hereinafter.

Figure 3:
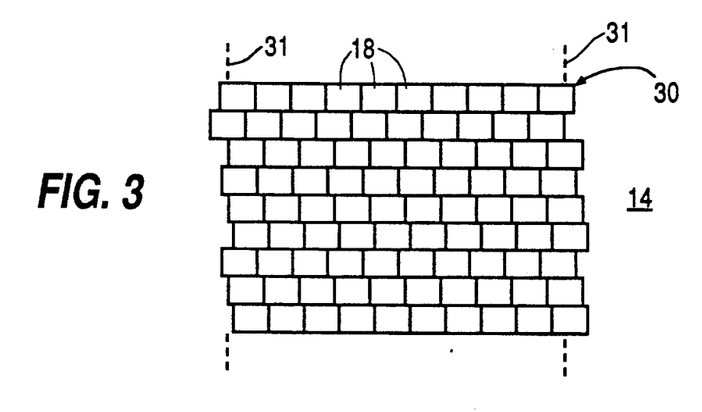

FIG. 3 shows the area face 14 of bundle 11 of FIG. 1. The square fibers (18) are joined, typically be epoxy cement, into ribbons in which a plurality of square fibers are positioned parallel to one another. Each horizontal row in FIG. 3 represents one such ribbon. The top row may be taken as representative and is designated 30. As can be seen from the figure, the ribbons are stacked on top of one another to form area face 14.

It may also be observed from the figure that the ends of the ribbons do not necessarily line up with one another. This misalignment is indicated by the protrusion of the ends of the ribbons by different lengths beyond broken vertical reference lines 31. The manner in which the misalignment is compensated for is discussed below.

Figure 4:
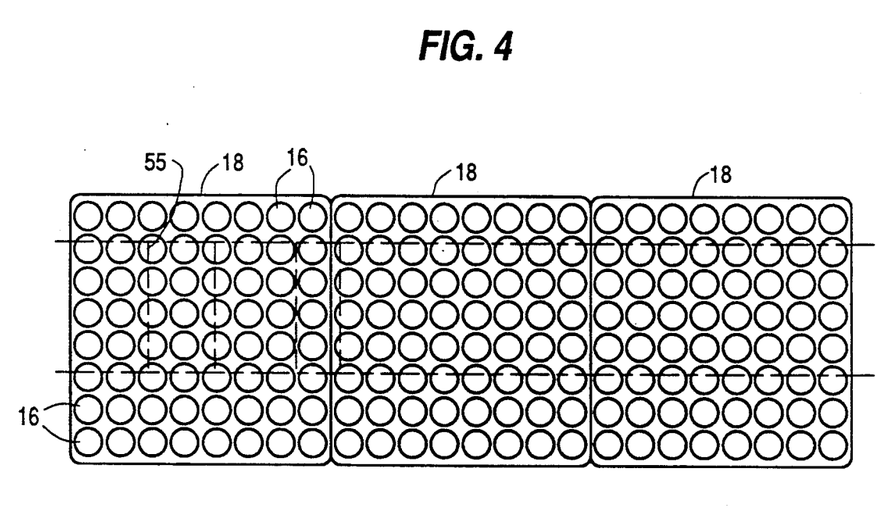
FIG. 4, is a schematic end view, of a portion of the linear face of the bundle of FIGS. 2 and 3.

FIG. 4 shows a schematic, enlarged end view of a portion of a ribbon including representative square compound fiber 18. Each representative compound fibers includes an 8×8 array of fiber cores and in one test embodiment, is 84 microns on a side. Each fiber core is about eight microns in diameter, the core fibers being separated by one to two microns.

Figure 5:
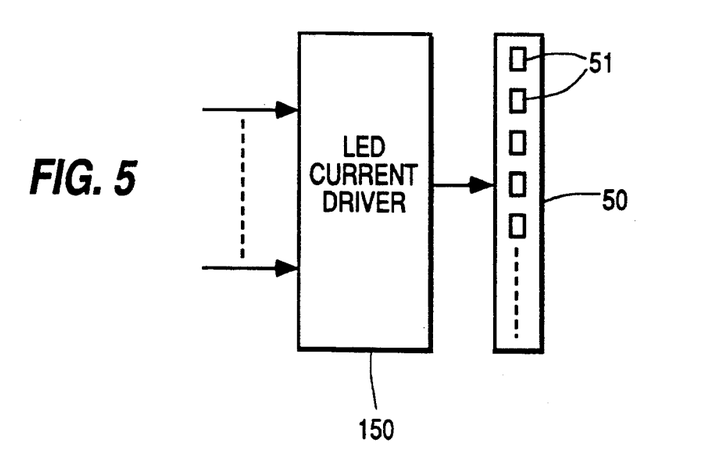
FIG. 5 is a schematic diagram of a portion of the subassembly of FIG. 1.

FIG. 5 shows schematically, an array of laser diodes or light emitting diodes (LED) formed in a semiconductor chip 50. The chip illustratively contains twenty five LEDs (one for reference) although only a representative number is shown. The LED's are designated 51 in the figure. The LED's are advantageously, edge emitting LED's with a small angle of dispersion on both axes such that the dispersion angle is smaller than the numerical aperture of the fiber core resulting in a high optical collection efficiency.

FIG. 1 shows the LED chip 50 positioned so that a lens 52 focuses an image of the LED's onto a mirror 53. Mirror 53 is rotated by a motor 54 to move an image of the LED array across area face 14 as shown in FIG. 1. In one embodiment, one LED was aligned with each row of square fibers shown in FIG. 3. A twenty four LED linear array was chosen so that the center to center spacing between the LED's corresponded exactly to the spacing between the stacked ribbons and the area face of the bundle had twenty four rows of square fibers. Mirror 53 was operated to scan the image of the LED's across the corresponding rows of square fibers from, say, left to right as viewed in FIG. 3. The twenty fifth diode is used for reference and timing as described fully in copending application Ser. No. 468,833 filed Jan. 23, 1990 and assigned to the assignee of the present application (U.S. Pat. No. 4,975,729).

FIG. 4 shows an image 55 of a representative LED sweeping across an end view of a representative compound fiber 18. The circles, representing the core fibers 16 in the figure, are spaced apart from one another, the spacings between the circles being filled also by glass but having an index of refraction of a cladding material chosen higher with respect to that of the core fibers to ensure total internal reflection of light energy in the fiber core.

Figure 6:
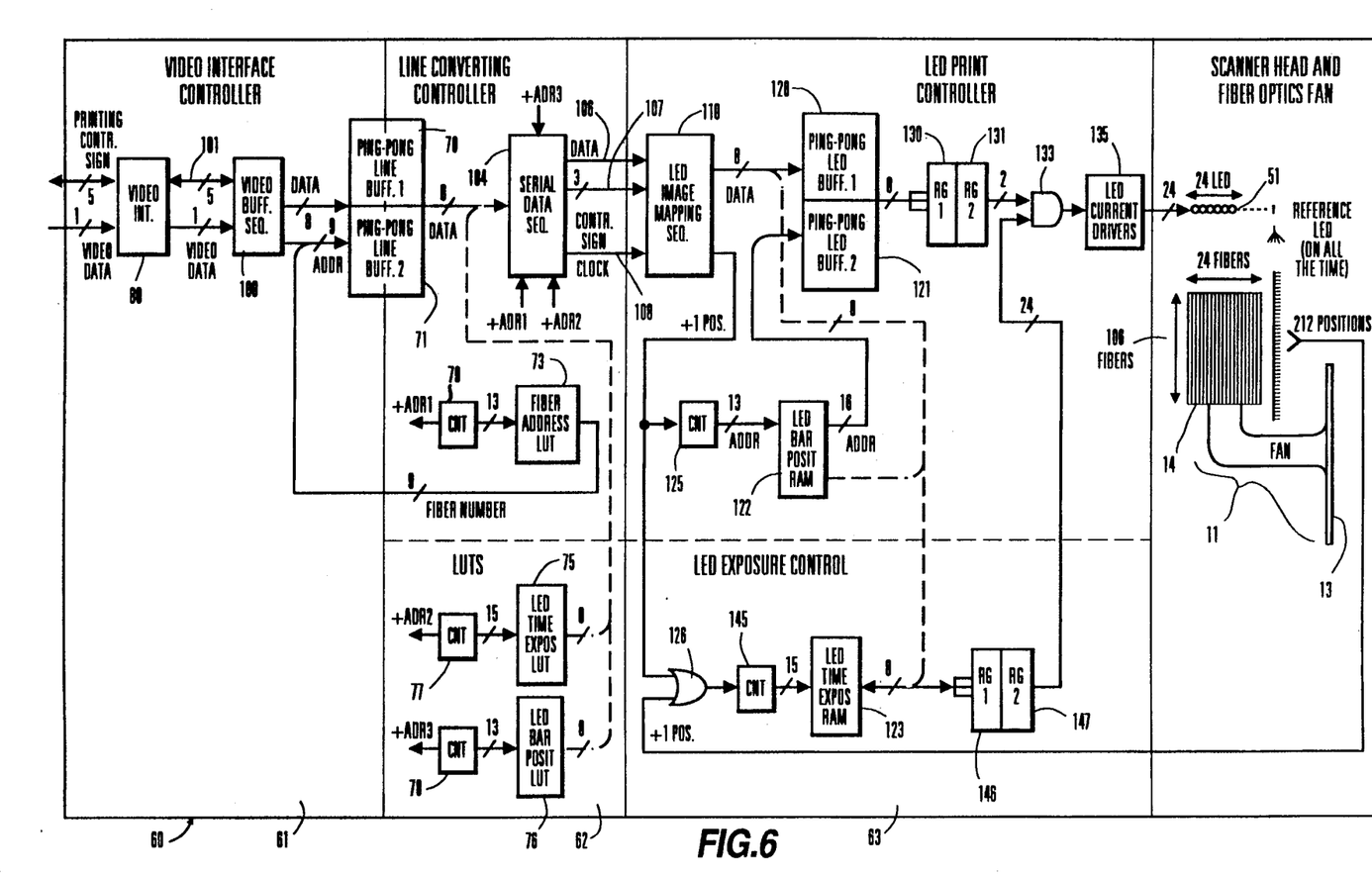
FIGS. 6 and 7 are schematic block diagrams for the electronic organization for a printer in accordance with the principles of this invention employing the subassembly of FIG. 1.

An image of an LED is produced when an LED is turned on. The LED is kept as long enough to achieve the desired white or black image area as its image is swept across the ribbon. An LED is turned on according to stored video data. FIG. 1 indicates the video data controller and synchronization circuit as block 60. FIG. 6 is a more detailed block diagram of the control circuit or controller. The LED image thus sweeps a path across the corresponding ribbon, the LED being turned on and off according to video input data to define black-white transitions represented by vertical broken lines (55) in FIG. 4.

FIG. 6 shows a fiber scan module controller (FSMC). The FSMC can be thought of as divided into three separate sections. The first is the video interface controller represented by block 61. The second is the line converting controller 62; the third, the LED print controller 63. FIG. 6 also shows schematically the fiber array along with a juxtaposed (optically) twenty four LED (actually twenty-five) array. The image of the LED array is moved or scanned along the vertical axis of the area face 14 of the bundle 11, as shown in FIG. 6, by the rotation of mirror 53 of FIG. 1. The video interface controller is operative to provide the stored video data for consecutive linear segments of an image in first and second buffers 70 and 71.

The line converting controller is operative to ensure that the proper pixel is generated in area face 14 in the proper sequence to correspond with the proper position for the pixel in linear face 13 as the image of the scanned LED array is scanned across the area face according to relationships stored in look up table (LUT) 73. The time exposures and LED bar position relationships are controlled by data stored in look up tables (LUT's) 75 and 76. The data stored in look up table 73, 75 and 76 are determined during an initialization procedure to be described below. Outputs of counters 77 and 78 are connected as address inputs to look up table 75 and 76 respectively. Similarly, the output of a counter 79 is connected as input to look up table 73. Other outputs of counters 77, 78 and 79 are designated adr1, adr2, and adr3 and also are connected as like-designated inputs to sequencer 104.

The LED print controller (63) is operative to turn the individual LED's of bar 50 on and off. Accordingly, controller 63 responds to the video data from controller 61 and to the data from look up tables 73, 75, and 76 to control the LED current drivers. The drivers switch the LED's on and off at given ribbon positions of FIG.

3, for controlling the exposure times of the LED's in the bar for the corresponding ribbon and for controlling the positions of the pixels as its image sweeps across the ribbon.

Figure 7:
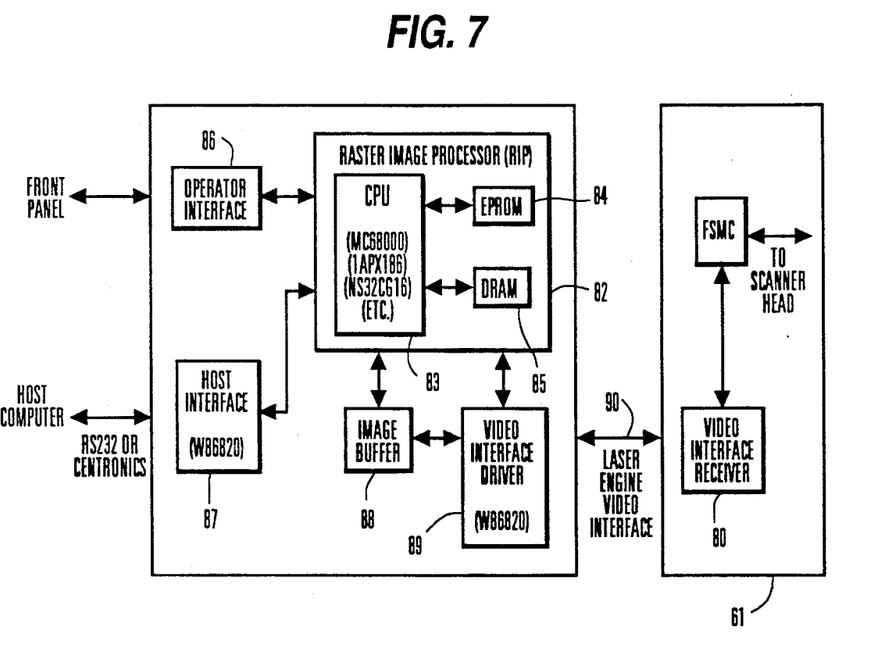

Video interface controller 61 includes a video interface receiver 80 that communicates with an external raster image processor 82 shown in FIG. 7. The raster image processor is a standard component of commercial laser printer controllers including a central processing unit (CPU) 83 with associated EPROM 84 and DRAM 85. The raster image processor is responsive to operator commands and host computer commands via interfaces 86 and 87 in conventional manner. The output of the raster image processor is connected to an image buffer 88 and data is transmitted to video interface receiver 80 via video interface driver 89 and representative line 90.

To this end, an output of video receiver 80 is connected to a video buffer sequencer 100 of FIG. 6. Buffer 100 is connected to receiver 80 also by a bidirectional channel 101. Outputs of buffer 100 are connected to inputs to line buffers 70 and 71 operative on an alternating ping-pong basis, one buffer being filled while the other outputs a data stream. The outputs of fiber address look up table 73 also are connected as inputs to buffers 70 and 71.

The outputs of buffers 70 and 71 are connected to inputs to serial data sequencer 104. Outputs of look up tables 75 and 76 also are connected as inputs to serial data sequencer 104. Outputs 106, 107, and 108 of sequencer 104 are connected to the inputs of LED image mapping sequencer 110.

Outputs of sequencer 110 are connected to inputs of ping pong LED buffers 120 and 121. Those same outputs are connected to inputs to LED bar position RAM 122 and to inputs to LED time exposure RAM 123. A pixel clock, generated at sequencer 110, is connected to the input to counter 125 and an input to OR circuit 126. The output of counter 125 is connected to an input to RAM 122. The output of RAM 122 is connected to inputs to buffers 120 and 121.

The outputs of buffers 120 and 121 are connected to inputs to registers 130 and 131. The outputs of registers 130 and 131 are connected to an input to AND circuit 133. The output of AND circuit 133 is connected to the input of LED current drivers 135. The outputs of drivers 135 are connected to LED array 51 for selectively directing light into face 14 of fiber optic bundle 11 as described above.

In an illustrative fiber optic bundle, there are 24 rows of fibers as shown in FIG. 3, rather than the nominal number of 51 mentioned above. There are 24 LED's to correspond to those rows. Also, there are 106 square fibers per row rather than the nominal number of 100. But, the system is operated to provide video information at (106×2=) 212 positions. That is to say, the multi-core ribbon structure permits a continuum of pixels to be imaged from end to end, a ribbon being viewed as a coherent and continuous light-transmitting waveguide wherein high resolution images can be transmitted.

The timing of black-white transitions determines the number of pixels per ribbon. The timing information can be provided by a position sensor associated with the reference LED mentioned above. The output of the sensor is connected to a second input to OR circuit 126 of FIG. 6. The output of OR circuit 126 is connected to an input to counter 145. The output of counter 145 is connected to an input to RAM 123. The output of RAM 123 is connected to registers 146 and 147. The outputs of registers 146 and 147 are connected to another input to AND circuit 133. The clock pulses, thus, determine "on" time of LED current drivers and thus determine the position of the LED image 55 with respect to the ribbons.

Registers 146 and 147, as well as registers 130 and 131 operate in parallel as do buffers 70 and 71 or buffers 120 and 121. That is to say, registers 130 and 146 fill with new data to be loaded into registers 131 and 147 while registers 131 and 147 output the old data.

The system is operative to provide the proper video data in synchronism with the proper ribbon positions in linear face 13. Also, in synchronism with the video data are the time exposure and pixel position information from look up tables 75 and 76. Tables 75 and 76 store the information in association with addresses of positions in area face 14 which corresponds to pixel positions in linear face 13. That information is down loaded by sequencer 104 to control the LED image mapping sequence as well as the LED bar position RAM and the LED time exposure RAM (122 and 123 respectively). The operation is consistent with that described in U.S. Pat. No. 4,760,421 mentioned above.

The information to coordinate pixels through a non-coherent or partially coherent fiber optic bundle is generated during an initialization procedure in which pixel positions in linear face 13 are stored in a look up table along with the address of a corresponding position in area face 14. In this manner a set of addresses in area face 14 corresponds to the set of pixels in linear face 13. The video data from video receiver 80 of FIG. 6 supplies the on-off information for each of those pixels. Also, other look up tables 75 and 76 store the length of time each LED is turned on and the LED to be turned on respectively. This information is generated, for example, during an initialization procedure in which an array of light sensors or photo detectors is juxtaposed optically with linear face 13. The LED's in array 50 are turned on one at a time as mirror 53 sweeps the image of the LED bar across area face 14. The density of sensors is high with respect to (square) fiber size. Accordingly, as a light spot (LED image) sweeps across one row of FIG. 3, several sensors are activated per square fiber.

The sensor array is read out many times during the passage of a light spot over a single square fiber. In this manner, the fact that a sensor first detects light provides the information as to the position at which a row or ribbon of FIG. 3 starts. The starting positions for the various rows may be different due to misalignment with respect to lines 31 as shown in FIG. 3. The misalignment is compensated for by providing a different delay (viz: voids or "off" signals) for each LED in bar 50 of FIG. 5 so that in operation of the printer, each LED is first enabled only at the correct start position of the corresponding row. Consequently, the proper sequence of pixels for that row will start at the proper position and thus properly correspond to the positions determined for them during the initialization procedure. An LED-driver circuit 150 in FIG. 5 (135 of FIG. 6) is operative to prevent premature activation in synchronism with the movement of 53 to move the image of the LED to the proper start position for the corresponding row of FIG. 3.

During the initialization period, the LED sweeps across the leading edge of a ribbon of square fibers and the sensor array is read out. The position of the light spot in the sequence of data exiting the sensor array thereafter is monitored to indicate the position of the opposite end of the instant row of fibers (ribbons) of FIG. 3. This procedure is important even if the manufacturing process for the fiber optic bundle orders the ribbons so that, for example, the linear face has the order ribbon 1, ribbon 2, ribbon 3,—corresponding to a known order for the ribbons in the area face as, for example, bottom row of FIG. 3 is ribbon 1, the next row is ribbon 2, etc. In the absence of such a manufacturing regimen, it is even more important that the relative positions of the ribbons in the two faces be ascertained by the initialization procedure.

Once the relative positions of the ribbons is ascertained, the light spot is moved and the sensors are read out to obtain a sensor position for each incremental spot position for each ribbon. This procedure produces a light spot address in area face 14 for each pixel in linear face 13. The pixel addresses are stored in look up tables 73.

The maximum number of image (pixels) transmitted by a ribbon depends on the LED image size. The compound fiber was represented as square in the illustrative embodiment. But the compound fiber may be any number of shapes including rectangular with a large aspect ratio (i.e. 50 to 1) to square, to rhombic.

Moreover, any array of light sources would be suitable for generating light spots. LED array 50 is only one example. Further, any array of light sensors may be used for sensing the presence of a light spot exiting the bundle of face 13. Emission tip devices comprising an array of tiny vacuum tube-like elements fabricated with semiconductor processing techniques also would be suitable for generating light spots.

A particularly attractive initialization scheme employs, for example, a charge-coupled device (CCD) camera with a pixel pitch of 20 microns or less where the numbers of CCD elements in the horizontal and vertical directions are sufficient to cover the proposed scan area. Preliminary to the initialization procedure, the area face of a bundle is illuminated, and an image of the linear face is captured by a CCD camera. The image is examined for voids and the bundle is rejected if voids are found. The linear face of the bundle is then illuminated in this scheme and an image of the area face is captured by the camera.

The scheme is discussed in terms of a specific illustration. Consider a plurality of multicore fibers arranged in twenty-four ribbons which are organized in a side-by-side relationship to form the linear face of the bundle and stacked one on top of another to form the area face. Assume also that the ribbons are organized in numerically-increasing order (viz: ribbon #1, ribbons #2, ribbon #3—etc.) from say left to right across the linear face and from bottom to top in the area face. In order to construct a perfect image transformer, the locations of pixel positions in the area face are determined with respect to the positions of pixels, transmitted through them, in the linear face. If we assume typical manufacturing problems where the ribbons' ends might be misaligned as discussed above and, perhaps, have different numbers of fibers in them the initialization procedure has to describe accurately all information voids and interject the so-generated characterizing information into the information stream as blank spots to be skipped or ignored by, say, the LED image system (53 of FIG. 1) as it sweeps across the area face of the bundle.

In the 600 dpi printer of FIG. 6, a line buffer (70 and 71) supplies the LED print head (51 of FIG. 6) with at least 5100 information pixels per line. The initialization procedure provides for additional padding to represent the voids corresponding to misaligned ribbons. Specifically, the position of start of each ribbon is identified by the CCD camera. The initialization procedure determines the positions of these voids in relation to the overall continuous ribbon image.

The initialization procedure is consistent with the assumption that each of the twenty-four ribbons can be imaged continuously by the corresponding LED. The initialization procedure also assumes that the scanning LED's are in effect scanning an area larger than the overall length of ribbon, an area large enough to encompass the widest ribbon. The procedure divides the width of the scanned area into imaginary reticles or coordinates where adjacent reticles are spaced modulo one pixel apart.

Figure 8:
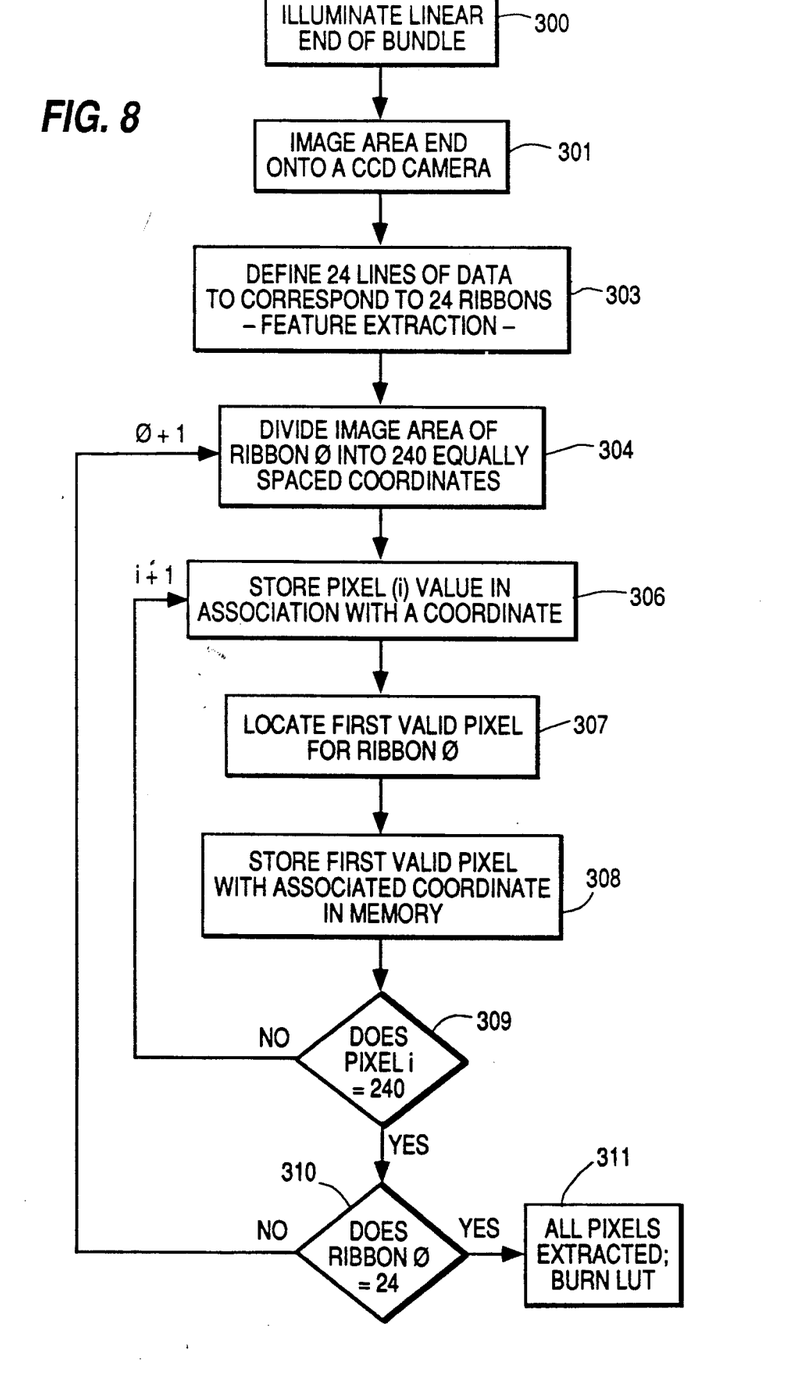
FIG. 8 is a block diagram representing the steps of an initialization procedure for the printer of FIGS. 1, 5 and 6.

In summary, the linear face of a bundle which does not include voids is illuminated with a constant light source as indicated in block 300 of FIG. 8. Next, the camera takes an image of the area face which includes misaligned ribbons. This step is indicated by block 301. The information is read into computer memory line (ribbon) by line and the voids are misalignment. designated, the voids at the ends of ribbons being indicative of misalingnment. This step is indicated by block 303. A look up table is constructed to store the spatial relationship of the beginning and end pixels to the sweep of the LED image across each ribbon as indicated by blocks 304 and 306. The procedure repeats for each end pixels in a ribbon and for each of the succession of 24 ribbons as indicated by blocks 309 and 310.

The data obtained during the initialization procedure is applied to inputs to current driver 150 of FIG. 5 or 135 of FIG. 6, "off" signals being applied at the start of each scan where the ribbon was determined to be offset from reference position (31 of FIG. 3) during the initialization procedure. That data is stored in a look up table (LUT) which is typically an electrically-alterable, read-only memory (EPROM) as indicated by block 311 to be available for later operation of a printer or scanner incorporating the optical subsystem including the initialized fiber optic bundle.

In the printing process, it is important to align the first LED pixel clock (first scanned position) with the first reticle assumed in the image processing step. Once this is established, the information that is loaded into the LED controller, includes the end voids along with the valid information itself. In essence, the video line data is expanded to include additional pixels to represent gaps or end voids in the bundle. The inclusion of these voids introduces a time delay between pixel n and pixel n+1. The time delay represents a multiplicity of pixel clock time periods.

The invention has been described in turns of black and white operation. Gray Scale is achieved conveniently by varying the exposure intensity and/or time and consequently the energy per pixel on a photosensitive medium or by statistically changing the amount of toner on an optically-sensitive drum creating limited apparent shades of black spots on a developed page.

What is claimed is:

1. Apparatus comprising a bundle of optical fibers, said bundle having the fiber ends organized in a linear array in a first face and in an area array in a second face, said apparatus including means for generating light controllably at positions in said area face which correspond with pixel positions in said first face, said bundle comprising a plurality of ribbons, each of said ribbons including a plurality of said fibers, the first ends of said ribbons being arranged side by side to form said linear first face, and the second ends of said ribbons being stacked one on top of another to form said area second face.

2. Apparatus as set forth in claim 1 wherein each of said fibers includes a plurality of fiber cores said fiber cores being arranged in rows and columns forming a coherent set.

3. Apparatus as set forth in claim 2 wherein each of said fibers has a rectangular cross-section contains m rows of n fiber cores.

4. Apparatus as set forth in claim 3 including photosensitive means optically coupled to said first end and means for moving said photosensitive means for juxtaposing successive linear segments of said photosensitive means with said first face.

5. Apparatus as set forth in claim 4 also including means for generating light controllably at said positions in said second face for each of said linear segments.

6. Apparatus as set forth in claim 5 also including first memory means for storing the addresses of said positions in said second face, and second memory means for storing video data for controlling the presence and absence of light at each of said positions, said apparatus also including means for synchronizing said first memory means and said means for generating light for reproducing an image stored in said second memory means on said photosensitive means.

7. Apparatus as set forth in claim 6 wherein said photosensitive means comprises an organic photoconductor and associated toner, transfer and fixer stations.

8. Apparatus as set forth in claim 6 wherein said means for generating light comprises a linear array of light sources and means for enabling each of said sources to provide valid pixels only after a characteristic delay determined during an initialization procedure.

9. Apparatus as set forth in claim 2 also including paper-positioning apparatus positioned at said linear first face for positioning a document there for scanning, said apparatus also including sensor means at said first face for sensing light signals representative of images on each of consecutive linear segments of said document.

10. Apparatus as set forth in claim 9 wherein said paper-positioning apparatus comprises a pair of pinch rollers for moving a document at said linear first face.

11. Apparatus as set forth in claim 2 wherein said means for generating light comprises a plurality of light sources.

12. Apparatus as set forth in claim 11 wherein said plurality of light sources comprises a linear array of light sources and means for moving an image of said array across said area second face.

13. Apparatus as set forth in claim 12 wherein said linear array of light sources comprises a semiconductor chip having an array of light emitting diodes defined therein said diodes being edge-emitting diodes with a characteristic dispersion angle smaller than the numerical aperture of a fiber core in said bundle for providing high optical collection efficiency.

14. Apparatus as set forth in claim 12 wherein said linear array of light sources comprises a semiconductor chip including an array of laser diodes.

15. Apparatus as set forth in claim 2 wherein said means for generating light includes a plurality of light sources which comprises a linear array of light sources and means for moving an image of said array across said area second face.

16. Apparatus as set forth in claim 15 including a memory for storing the "turn-on" time for each light source of linear array responsive to data stored in a look up table.

17. A method for determining the positions of pixels in a first face of a fiber optic bundle corresponding to the proper positions for those pixels in a second face of the bundle for transmitting faithfully the light energy introduced to said first face, said method comprising the steps of illuminating said second face, capturing an image of said first face electronically, dividing said image into a plurality of lines each having m equally-spaced coordinates, locating the first "on" pixel in a first of said lines, storing the coordinate of said first "on" pixel, repeating the foregoing steps for each of said m coordinates in a line, and repeating the foregoing steps for each of said lines.

18. A method for determining the positions of pixels in a linear first face of a fiber optic bundle corresponding to the proper positions for those pixels in an area second face of the bundle for transmitting faithfully to said first face or image introduced at said second face where said bundle is formed in ribbons organized side by side to form said first face and one on top of another to form said second face said method comprising the steps of illuminating said first face, obtaining a digital representation of the locations of light spots in said second face for defining for each of said ribbons in said second face a number of reticles large compared to the number of fibers therein, storing a pixel value in association with each of said reticles, and storing a first valid pixel for each of said ribbons.

19. A method for operating apparatus including a fiber optic bundle comprising m ribbons of multicore fibers, said ribbons being positioned at a first end in a side by side relationship to form a linear first face of said bundle, said ribbons being positioned at a second end on top of one another to form an area second face of said bundle, said method comprising the steps of directing a pattern of m light sources at respective ones of said m ribbon, in said second face sweeping said pattern across n reticles defined with respect to each of said ribbons from a leading edge of each of said ribbons to a trailing edge thereof, providing R "invalid" intial signals for each ribbon displaced R reticles from a reference start position, and after said start position for each of said ribbons providing n clock pulses corresponding to said reticles for enabling the corresponding ones of said m light sources to provide light according to stored video data representative of an image.

* * * * *